(12) United States Patent
Cohen et al.

(10) Patent No.: US 9,052,709 B2
(45) Date of Patent: Jun. 9, 2015

(54) METHOD AND SYSTEM FOR PROVIDING PROCESS TOOL CORRECTABLES

(75) Inventors: Guy Cohen, Yaad (IL); Dana Klein, Haifa (IL); Pavel Izikson, Haifa (IL)

(73) Assignee: KLA-Tencor Corporation, Milpitas, CA (US)

( * ) Notice: Subject to any disclaimer, the term of this patent is extended or adjusted under 35 U.S.C. 154(b) by 486 days.

(21) Appl. No.: 13/185,033

(22) Filed: Jul. 18, 2011

(65) Prior Publication Data

US 2012/0029856 A1 Feb. 2, 2012

Related U.S. Application Data

(60) Provisional application No. 61/369,584, filed on Jul. 30, 2010.

(51) Int. Cl.
*G06F 19/00* (2011.01)
*G05B 19/418* (2006.01)

(52) U.S. Cl.
CPC *G05B 19/41875* (2013.01); *G05B 2219/32182* (2013.01)

(58) Field of Classification Search
CPC .............. G06F 19/00; G05B 19/41875; G05B 2219/32182; G03C 5/00; H01L 21/66; G01N 21/274; G01N 21/95607; G01N 2021/213; G01R 35/005; G01R 27/28; G03F 7/70616; G03F 7/70625; G03F 7/70641; G03F 7/7065

USPC ............................................... 702/85; 430/30
See application file for complete search history.

(56) References Cited

U.S. PATENT DOCUMENTS

| | | | |
|---|---|---|---|
| 6,999,836 | B2 | 2/2006 | Schwarm et al. |
| 7,242,995 | B1 * | 7/2007 | Morgenson et al. .......... 700/103 |
| 2005/0027481 | A1 | 2/2005 | Yang et al. |
| 2005/0187649 | A1 | 8/2005 | Funk et al. |
| 2007/0081170 | A1 | 4/2007 | Sezginer et al. |
| 2008/0057418 | A1 * | 3/2008 | Seltmann et al. ............... 430/30 |
| 2008/0286885 | A1 * | 11/2008 | Izikson et al. ..................... 438/7 |
| 2009/0132447 | A1 * | 5/2009 | Milenova et al. ............... 706/12 |
| 2010/0112467 | A1 | 5/2010 | Chung |

* cited by examiner

*Primary Examiner* — Mohamed Charioui
*Assistant Examiner* — Ruihua Zhang
(74) *Attorney, Agent, or Firm* — Suiter Swantz pc llo

(57) ABSTRACT

The present invention may include performing a first measurement process on a wafer of a lot of wafers, wherein the first measurement process includes measuring one or more characteristics of a plurality of targets distributed across one or more fields of the wafer, determining a set of process tool correctables for a residual larger than a selected threshold level utilizing a loss function, wherein the loss function is configured to fit a model for one or more process tools, as a function of field position, to one or more of the measured characteristics of the plurality of targets, wherein the set of process tool correctables includes one or more parameters of the model that act to minimize the difference between a norm of the residual and the selected threshold, and utilizing the determined process tool correctables to monitor or adjust one or more processes of the process tools.

25 Claims, 8 Drawing Sheets

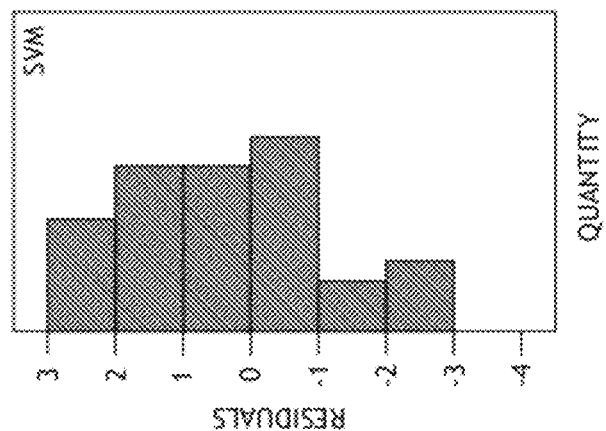
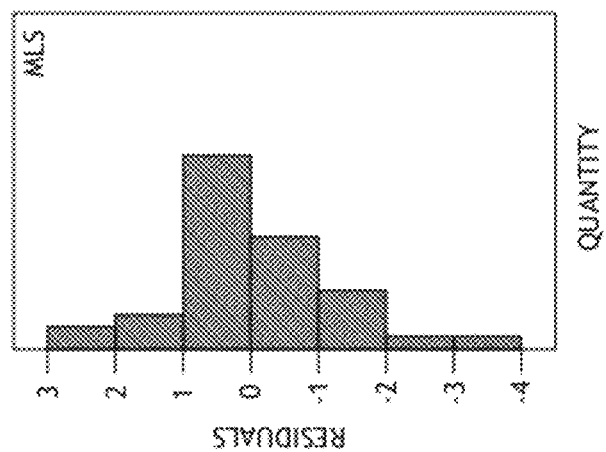
FIG. 4A

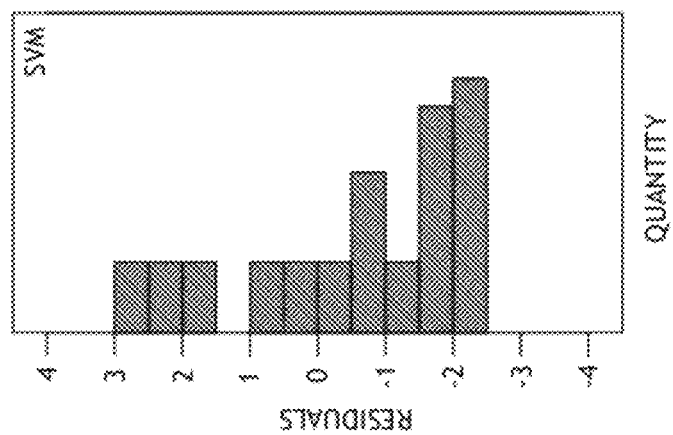
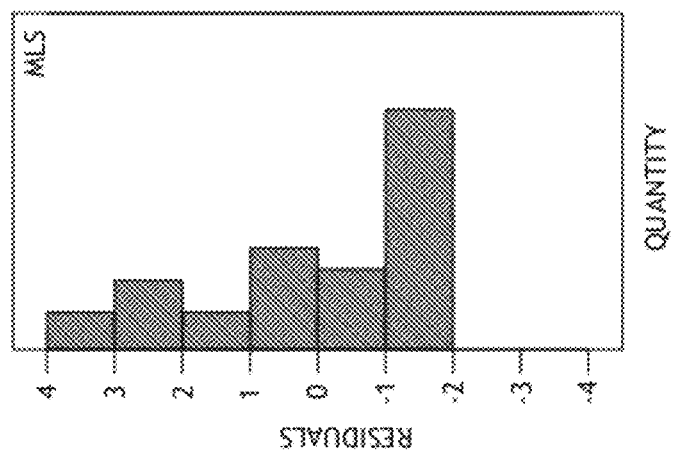
FIG. 4B

600

602 — performing a first measurement process on a wafer of a first lot of wafers, wherein the first measurement process includes measuring one or more characteristics of a plurality of targets distributed across one or more fields of the wafer of the first lot of wafers 604 — determining a first and second set of process tool correctables utilizing a loss function configured to calculate the first set of process tool correctables when a residual is larger than a selected threshold level and the second set of process tool correctables when the residual is smaller than the selected threshold level, wherein the loss function is configured to fit a model for one or more process tools, as a function of field position, to one or more of the measured characteristics of the plurality of targets, wherein the first set of process tool correctables includes one or more parameters of the model that minimize the difference between a scaled residual and the selected threshold, wherein the second set of process tool correctables includes one or more parameters of the model that minimize the scaled residual 606 — utilizing the determined first set of process tool correctables and second set of process tool correctables to monitor or adjust one or more processes of the one or more process tools 608 — performing a self-consistency routine on the first set of process tool correctables and the second set of process tool correctables

FIG. 6

METHOD AND SYSTEM FOR PROVIDING PROCESS TOOL CORRECTABLES

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of U.S. Provisional Patent Application entitled NOVEL METHOD TO DETERMINE OPTIMAL SET OF OVERLAY CORRECTABLES USING SUPPORT VECTOR MACHINE ALGORITHM, naming Pavel Izikson as inventor, filed Jul. 30, 2010, Application Ser. No. 61/369,584.

TECHNICAL FIELD

The present invention generally relates to a method and system for providing semiconductor process tool correctables to a process tool.

BACKGROUND

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etching, deposition, and ion implantation. Multiple semiconductor devices may be fabricated in an arrangement on a single semiconductor wafer and then separated into individual semiconductor devices.

Metrology processes are used at various steps during a semiconductor manufacturing process to monitor and control one or more semiconductor layer processes. For example, metrology processes are used to measure one or more characteristics of a wafer such as dimension (e.g., line width, thickness, etc.) of features formed on the wafer during a process step, wherein the quality of the process step can be determined by measuring the one or more characteristics. One such characteristic includes overlay error. An overlay measurement generally specifies how accurately a first patterned layer aligns with respect to a second patterned layer disposed above or below it or how accurately a first pattern aligns with respect to a second pattern disposed on the same layer. The overlay error is typically determined with an overlay target having structures formed on one or more layers of a work piece (e.g., semiconductor wafer). The structures may take the form of gratings, and these gratings may be periodic. If the two layers or patterns are properly formed, then the structure on one layer or pattern tends to be aligned relative to the structure on the other layer or pattern. If the two layers or patterns are not properly formed, then the structure on one layer or pattern tends to be offset or misaligned relative to the structure on the other layer or pattern. Overlay error is the misalignment between any of the patterns used at different stages of semiconductor integrated circuit manufacturing. Conventionally, understanding of the variation across die and wafer are limited to the fixed sampling and hence overlay error is detected only for the known selected sites.

Moreover, if a measured characteristic, such as overlay error, of the wafer is unacceptable (e.g., out of a predetermined range for the characteristic), the measurement of the one or more characteristics may be used to alter one or more parameters of the process such that additional wafers manufactured by the process have acceptable characteristics.

In the case of overlay error, an overlay measurement may be used to correct a lithography process in order to keep overlay errors within desired limits. For example, overlay measurements may be fed into an analysis routine that calculates "correctables" and other statistics, which may be used by the operator in order to better align the lithography tool used in the wafer processing.

SUMMARY

A method for providing process tool correctables to one or more process tools is disclosed. In one aspect, a method may include, but is not limited to, performing a first measurement process on a wafer of a lot of wafers, wherein the first measurement process includes measuring one or more characteristics of a plurality of targets distributed across one or more fields of the wafer of the lot of wafers; determining a set of process tool correctables for a residual larger than a selected threshold level utilizing a loss function, wherein the loss function is configured to fit a model for one or more process tools, as a function of field position, to one or more of the measured characteristics of the plurality of targets, wherein the set of process tool correctables includes one or more parameters of the model that act to minimize the difference between a norm of the residual and the selected threshold; and utilizing the determined set of process tool correctables to monitor or adjust one or more processes of the one or more process tools.

In another aspect, a method may include, but is not limited to, performing a first measurement process on a wafer of a first lot of wafers, wherein the first measurement process includes measuring one or more characteristics of a plurality of targets distributed across one or more fields of the wafer of the first lot of wafers; determining a first and second set of process tool correctables utilizing a loss function configured to calculate the first set of process tool correctables when a residual is larger than a selected threshold level and the second set of process tool correctables when the residual is smaller than the selected threshold level, wherein the loss function is configured to fit a model for one or more process tools as a function of field position to one or more of the measured characteristics of the plurality of targets, wherein the first set of process tool correctables includes one or more parameters of the model that minimize the difference between a scaled residual and the selected threshold, wherein the second set of process tool correctables includes one or more parameters of the model that minimize the scaled residual; and utilizing the determined first set of process tool correctables and second set of process tool correctables to monitor or adjust one or more processes of the one or more process tools.

In another aspect, a method may include, but is not limited to, performing a first measurement process on a wafer of a first lot of wafers, wherein the first measurement process includes measuring one or more characteristics of a plurality of targets distributed across one or more fields of the wafer of the first lot of wafers; determining a set of process tool correctables utilizing a loss function configured to calculate the set of process tool correctables for a residual below a selected threshold level, wherein the loss function is configured to fit a model for one or more process tools as a function of field position to one or more of the measured characteristics of the plurality of targets, wherein one or more parameters of the dependence curve act to minimize the square of the residual; and utilizing the determined set of process tool correctables to monitor or adjust one or more processes of the one or more process tools.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 4A illustrates a pair of residual distributions derived via a conventional MLS algorithm and a novel Support Vector Machine based loss function in accordance with one embodiment of the present invention.

FIG. 4B illustrates a pair of residual distributions derived via a conventional MLS algorithm and a novel Support Vector Machine based loss function in accordance with one embodiment of the present invention

FIG. 6 is a flow diagram illustrating a method for providing process tool correctables to one or more process tools, in accordance with one embodiment of the present invention.

DETAILED DESCRIPTION OF THE INVENTION

Figure 1B:
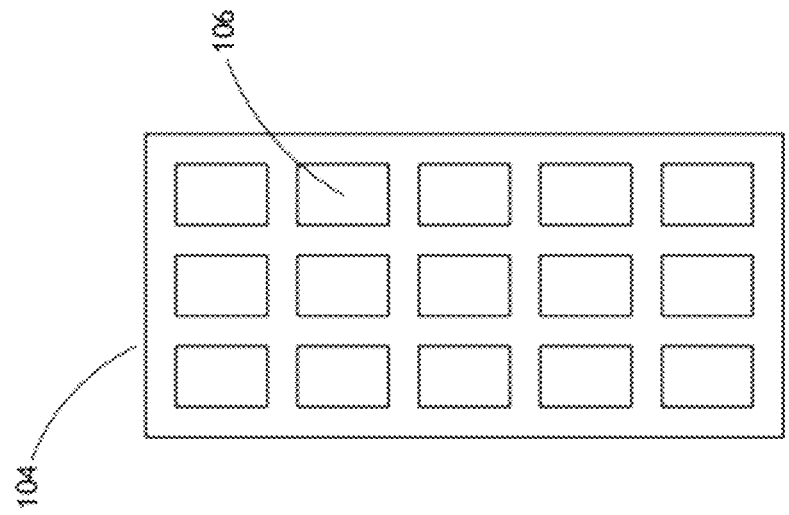
FIG. 1B illustrates a top plan view of an individual field of a semiconductor wafer showing a plurality of targets within the field.

Reference will now be made in detail to the subject matter disclosed, which is illustrated in the accompanying drawings.

Referring generally to FIGS. 1A through 7, a method and system for providing process tool correctables to one or more process tools is described in accordance with the present disclosure. Conventionally, a metrology process, such as overlay metrology or critical dimension (CD) metrology, is carried out at fixed locations of a semiconductor wafer. These metrology measurements may then be used to calculate corrections, known as "correctables," used to correct an associated process tool used to perform a given process on the semiconductor wafer. These correctables include overlay correctables, dose correctables, and focus correctables. The present invention is directed at a novel method and system for providing correctables to one or more process tools.

As used throughout the present disclosure, the term "correctable" generally refers to data that may be used to correct the alignment of a lithography tool or scanner tool to improve the control of subsequent lithographic patterning with respect to overlay performance. In a general sense, the correctables allow the wafer process to proceed within predefined desire limits by providing feedback and feedforward to improve process tool alignment.

As used throughout the present disclosure, the term "wafer" generally refers to a substrate formed of a semiconductor or non-semiconductor material. For example, a semiconductor or non-semiconductor material include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed.

A typical semiconductor process includes wafer processing by lot. As used herein a "lot" is a group of wafers (e.g., group of 25 wafers) which are processed together. Each wafer in the lot is comprised of many exposure fields from the lithography processing tools (e.g. steppers, scanners, etc.). Within each field may exist multiple die. A die is the functional unit which eventually becomes a single chip. On product wafers, overlay metrology targets are typically placed in the scribeline area (for example in the 4 corners of the field). This is a region that is typically free of circuitry around the perimeter of the exposure field (and outside the die). In some instances, overlay targets are placed in the streets, which are regions between the die but not at the perimeter of the field. It is fairly rare for overlay targets to be placed on product wafers within the prime die areas, as this area is critically needed for circuitry. Engineering and characterization wafers (not production wafers), however, typically have many overlay targets throughout the center of the field where no such limitations are involved. Because of the spatial separation between the "scribe-line" metrology marks and the prime die circuitry, there occur discrepancies between what is measured and what needs to be optimized on product wafers. Advances in both the scribe-line metrology marks and in their interpretation are required.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Figure 2:
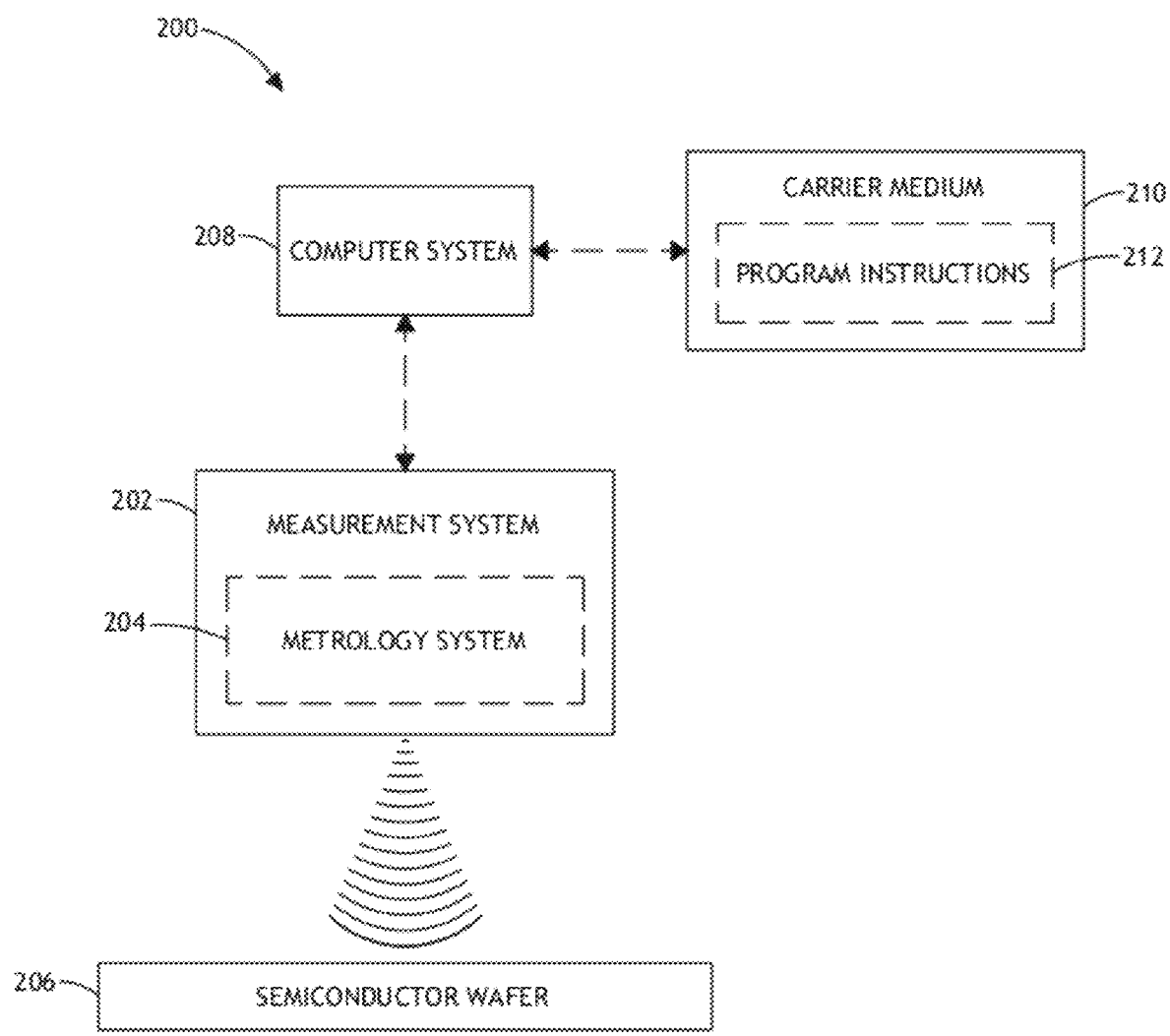
FIG. 2 is a block diagram illustrating a system for providing process tool correctables to one or more process tools, in accordance with one embodiment of the present invention.

FIG. 2 illustrates a system 200 for providing process tool correctables to one or more process tools. In one embodiment, the system 200 may include a measurement system 204, such as a metrology system 204 configured to perform overlay metrology or CD metrology at identified locations of the semiconductor wafer 204. The metrology system 204 may include any appropriate metrology system known in the art, such as, but not limited to, a metrology system suitable for critical dimension metrology. In a further embodiment, the metrology system 204 may be configured to accept instructions from another subsystem of the system 200 in order to carry out a designated metrology plan. For instance, the metrology system 204 may accept instructions from one or more computer systems 208 of the system 200. Upon receiving the instructions from the computer system 208, the metrology system 204 may perform overlay metrology or CD measurements at the locations of the semiconductor wafer 206 identified in the provided instructions. As will be later discussed, the instructions provided by the computer system 208 may include a loss function algorithm (e.g., Support Vector Machine algorithm) configured to determine one or more sets of process tool correctables of a given process tool. The particular aspects of the various embodiments of the loss functions of the present invention are discussed in greater detail further herein. The correctables calculated by the computer system 208 may then be fedback to a process tool, such as a scanner tool or lithography tool, of the system 200.

In one embodiment, the one or more computer systems 208 may be configured to receive a set of measurements performed by the measurement system 202 (e.g., metrology system 204) in a sampling process of one or more wafers of a lot. The one or more computer systems 208 may further be configured to calculate a set of process tool correctables using the received measurements from the sampling process. Moreover, the one or more computer systems 208 may then transmit instructions to an associated process tool (e.g., scanner tool or lithography) tool to adjust the process tool. Alternatively and/or additionally, the computer system 208 may be utilized to monitor one or more process tools of the system. In this sense, in the event the residuals of a residual distribution exceed a predetermined level the computer system 208 may 'fail' the lot of wafers. In turn, the lot of wafers may be 'reworked.'

It should be recognized that the steps described above may be carried out by a single computer system 208 or, alternatively, a multiple computer systems 208. Moreover, different subsystems of the system 200, such as the metrology system 204, may include a computer system suitable for carrying out at least a portion of the steps described above. Therefore, the above description should not be interpreted as a limitation on the present invention but merely an illustration.

In another embodiment, the one or more computer systems 208 may transmit instructions to one or more process tools which are indicative of a process tool correctables derived from one or more of the various loss functions described further herein. Further, the transmitted instructions may contain information indicative of overlay, focus, and dose correctables. Moreover, the one or more computer systems 208 may be configured to perform any other step(s) of any of the method embodiments described herein.

In another embodiment, the computer system 208 may be communicatively coupled to the measurement system 202 or a process tool in any manner known in the art. For example, the one or more computer systems 208 may be coupled to a computer system of a measurement system 202 (e.g., computer system of a metrology system 204) or to a computer system of a process tool. In another example, the measurement system 202 and a process tool may be controlled by a single computer system. In this manner, the computer system 208 of the system 200 may be coupled to a single metrology-process tool computer system. Moreover, the computer system 208 of the system 200 may be configured to receive and/or acquire data or information from other systems (e.g., inspection results from an inspection system, metrology results from a metrology system, or process tool correctables calculated from a system, such as KLA-Tencor's KT Analyzer) by a transmission medium that may include wireline and/or wireless portions. In this manner, the transmission medium may serve as a data link between the computer system 208 and other subsystems of the system 200. Moreover, the computer system 208 may send data to external systems via a transmission medium. For instance, the computer system 208 may send calculated process tool correctables to a separate metrology system, which exists independently of the described system 200.

The computer system 208 may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium.

Program instructions 212 implementing methods such as those described herein may be transmitted over or stored on carrier medium 210. The carrier medium may be a transmission medium such as a wire, cable, or wireless transmission link. The carrier medium may also include a storage medium such as a read-only memory, a random access memory, a magnetic or optical disk, or a magnetic tape.

The embodiments of the system 200 illustrated in FIG. 2 may be further configured as described herein. In addition, the system 200 may be configured to perform any other step(s) of any of the method embodiment(s) described herein.

Figure 3:
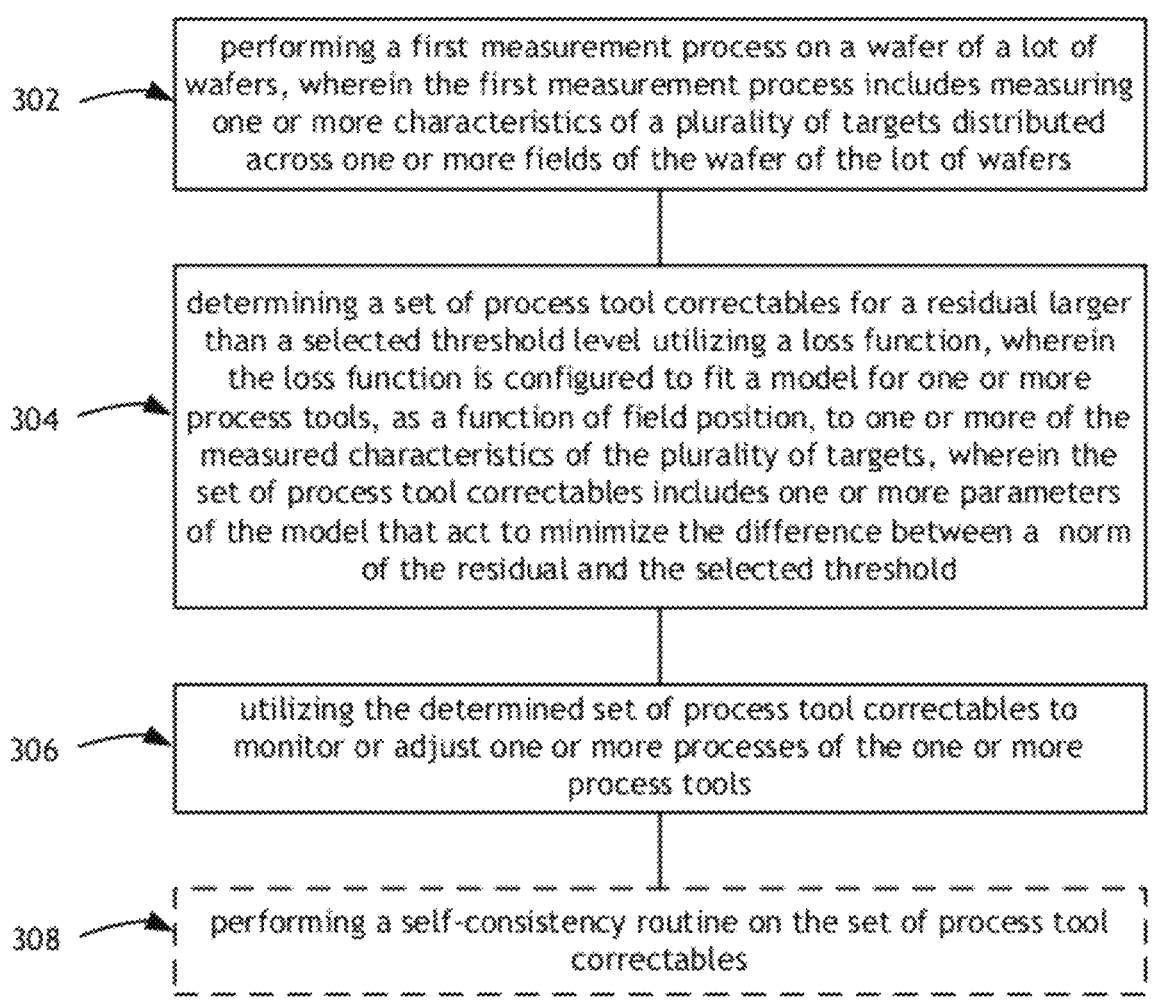
FIG. 3 is a flow diagram illustrating a method for providing process tool correctables to one or more process tools, in accordance with one embodiment of the present invention.

FIG. 3 is a flow diagram illustrating steps performed in a method 300 for providing process tool correctables to one or more process tools. In a first step 302, a first measurement process may measure one or more characteristics of a plurality of targets distributed across one or more fields of a wafer of a lot of wafers.

In one embodiment, the first measurement process may include a metrology process. The metrology process may include any metrology process described herein, including, but not limited to, overlay measurements, CD measurements, dose measurements, or focus measurements. In another embodiment, the measured characteristic may include any quantity that may be measured utilizing a metrology measurement process. For example, the measured characteristic, may include, but is not limited to overlay error, CD values (e.g., CD line width, feature shape, profile information, and the like), dose, or focus.

In one embodiment, the method 300 includes performing the measurements on one or more wafers in at least one lot of wafers at multiple measurement spots on the one or more wafers. The measurement spots may include one or more fields 104 on one or more wafers 102. For example, as shown in FIG. 1, wafer 102 has a plurality of fields 104 formed thereon. Although a particular number and arrangement of fields 104 on wafer 102 are shown in FIG. 1, the number and arrangement of fields on the wafer may vary depending on, for example, the device being formed on the wafers. The measurements may be performed at multiple fields 104 formed on wafer 102 and at multiple fields on other wafers in at least a first lot. The measurements may be performed on device structures formed in the fields and/or on test structures formed in the fields. In addition, the measurements performed in each of the fields may include all of the measurements performed during the metrology process (e.g., one or more different measurements).

Figure 1A:
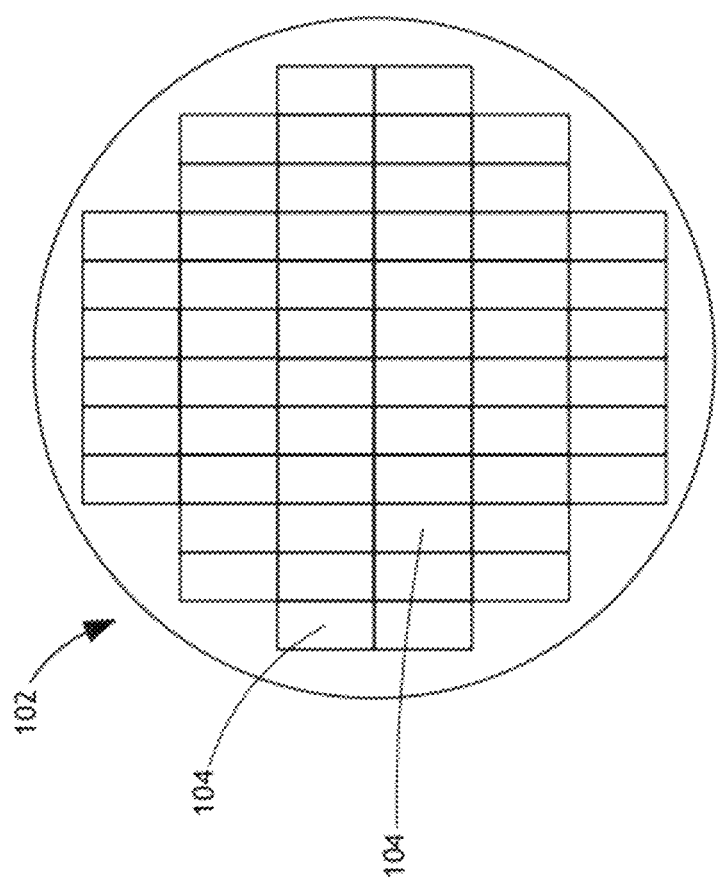
FIG. 1A illustrates a top plan view of a semiconductor wafer with demarked fields.

In another embodiment, all of the measurement spots measured in an sampling process may include multiple targets with each measured field of the wafers in a given lot. For example, as shown in FIG. 1A, field 104 formed on a wafer 102 may include a plurality of targets 106. Although a particular number and arrangement of targets 106 in field 104 are shown in FIG. 1B, the number and arrangement of targets 106 in the fields 104 may vary depending on, for example, the device being formed on the wafer 102. Targets 106 may include device structures and/or test structures. In this embodiment, therefore, the measurements may be performed on any number of targets 106 formed in each field 104. The measurements may also include all of the measurements that are performed during the metrology process (e.g., one or more different measurements).

In another embodiment, the results of the measurements performed in the sampling step include information concerning variation in the measurement process. The variation in the measurements may be determined in any manner known in the art (e.g., standard deviation, amount of variation, etc.). Since the variation in the measurements will generally indicate variations in the process or process excursions, the number of lots of wafers that are measured in a sampling step may vary depending on the process or the process excursions. The sources of variation that are identified or determined in this step may include any sources of variation including, but not limited to, overlay variation, critical dimension (CD) variation, variation in other characteristics of the wafers, lot-to-lot variation, wafer-to-wafer variation, field-to-field variation, side-to-side variation, statistical sources of variation, and the like, or any combination thereof.

Measurement processes and systems suitable for implementation in the present invention are described generally in U.S. patent application Ser. No. 12/107,346, filed on Apr. 22, 2008, which has been incorporated above by reference.

In a second step 304, a set of process tool correctables for a residual larger than a selected threshold level may be determined via a loss function using the measurement results of step 302. In one aspect, the loss function is configured to fit a model for one or more process tools as a function of field position to one or more of the measured characteristics of step 302. In another aspect, the calculated set of process tool correctables includes parameter values of the model which act to minimize the difference between a norm of the residual and the selected threshold value. In a third step 306, the determined set of process tool correctables may be utilized to monitor or adjust one or one or more process tools.

It should be recognized by those skilled in the art that the measured characteristics (e.g., overlay error or PPE) of step 302 may be utilized to improve control of subsequent lithographic processes and to determine whether the quality of a lithographic pattern meets predetermined requirements. In one embodiment, overlay or CD metrology data may be used to calculate an overlay correctable, a dose correctable, or a focus correctable for each field 104 of the measured wafer 102. These correctable values may then be sent to a lithography tool to improve the lithography tools performance. In a general sense, the correctable data may be used to correct the alignment of a lithography tool (e.g., stepper) or scanner tool to improve the control of subsequent lithographic patterning with respect to overlay performance.

It should further be recognized by those skilled in the art that the techniques for determining overlay described herein may be suitable for a wide variety of photolithography processes, such as semiconductor device fabrication photolithographic process, optical device manufacturing, micro-mechanical manufacturing, and the like.

In one aspect of the present invention, the loss function of step 304 may include a Support Vector Machine (SVM) algorithm. The SVM loss function of the present invention may take the form:

$$SVM \text{ Loss Function} = \begin{cases} 0 & |y - f(x, \beta)| < Th \\ |y - f(x, \beta)| - Th & \text{Otherwise} \end{cases} \quad \text{(Eq. 1)}$$

where y represents a characteristic (e.g., overlay error) measured at a selected position (e.g., position along x-axis), $f(x,\beta)$ represents a model fitted to the set of measured characteristics of step 302, wherein $\beta$ represents the parameters of the utilized modeling function, and the quantity $|y-f(x,\beta)|$ represents the 'norm' of the residual $y-f(x,\beta)$. Moreover, 'Th' represents a threshold residual value. It should be recognized by those skilled in the art that the specific form of $f(x,\beta)$ may depend on a variety of factors. In a general sense any suitable overlay function known in the art may be utilized as $f(x,\beta)$ of the SVM loss function of Eq. 1.

Traditionally, overlay errors taken from the fields of a wafer may be used to determine a linear overlay function. The linear overlay function may then be used as correctables for an associated process tool, such as a scanner or stepper tool. In addition to linear overlay functions, a high-order nonlinear overlay function may be implemented as an overlay function to calculate the corresponding correctables for a given process tool. For example, an analyzer (e.g., KLA-Tencor's KT Analyzer) may be configured to implement higher order models, which may then be used to input overlay and CD metrology data to calculate correctables on a field-by-field basis across a wafer. The intrafield correctables may include, but are not limited to, overlay correctables, focus correctable, and dose correctables. The associated table of intrafield correctables produced for each field of the measured wafer may include any correctable value known in the art.

For example, a linear regression may be applied to the target characteristics (e.g., measured overlay) of step 302. For instance, the overlay as a function translation, rotation, and/or magnification may be obtained from a set of overlay targets (e.g., four corner overlay targets). A linear regression may be applied to the above data sets, yielding one or more sets of correctables. These correctables may then be utilized by a process tool, such as a scanner tool.

Moreover, in a general sense, a higher order term model may be applied to the target characteristics (e.g., measured overlay or PPE) of step 302 in order to calculate a set of process tool correctables. For instance, overlay along the x-axis may be modeled utilizing a function of the form: $Ax+Bx^2$. In another embodiment, the function used to model overlay along a given direction may be based on a trigonometric function. The higher order function may then be used to determine lot disposition.

In a general sense, a range of correctables (e.g., higher order terms of fitted model) acceptable in a given process may be predetermined for a given nonlinear function. In the event that a measured value exceeds this predetermined range, the lot may be 'failed,' forcing the lot to be 'reworked.' For instance, a photoresist may be stripped, the lithography tool adjusted, and a new pattern of photoresist is then applied to the wafer or wafers.

In a further embodiment, higher ordered terms may be disregarded, such that only linear terms of a given model fit are used as the correctables for a given process tool. For instance, in the example shown above, the $2^{nd}$ order term given by 'Bx²' may be disregarded and only the 'Ax' term may be utilized by a process tool, such as to adjust magnification of a scanner tool.

It should further be recognized that the target measurements of step 302 may be utilized to calculate correctables for both field-by-field variations and intrafield variations.

Overlay functions in general and overlay functions for field-to-field and intrafield variations, in particular, used in the calculation of process tool correctables are described in U.S. Pat. No. 7,876,438, issued on Jan. 25, 2011, and is incorporated herein by reference.

It is contemplated herein that the higher ordered functions described throughout the instant disclosure may be implemented as the function $f(x,\beta)$ provided in SVM based loss function of Eq. 1 above.

Referring again to Eq. 1 above, the SVM loss function of step 304 of the present invention acts to minimize the quantity:

$$|y-f(x,\beta)-Th \quad \text{(Eq. 2)}$$

wherein the quantity by Eq. 2 is minimized with respect to the model parameters $\beta$. In this manner the SVM loss function nullifies residuals which are below the threshold value, Th. As such, the SVM algorithm of Eq. 1 only calculates the correctables for residuals that are larger than the threshold value Th by minimizing the difference between the residual and the threshold value with respect to the model parameters $\beta$.

The SVM based loss function of Eq. 1 is particularly advantageous in those instances where outliers or 'tails' of a given residual distribution might otherwise lead an analyzer to fail the lot. In this manner, it should be recognized by those skilled in the art that under conventional correctable calculation techniques there are instances where a given residual distribution may erroneously fail a given lot during process. For instance, a MLS analysis routine minimizes an average of the residuals associated with the measured characteristic (e.g., overlay). The MLS routine, however, does not emphasize the residual values at the tails of the residual distribution. Thus, it is not uncommon for a tail of a residual distribution, although representing a minority of the residuals making up the distribution, to fail the associated lot in situations where the tail residual is above a predetermined residual specification. As such the implementation of the SVM loss function in step 304 of the present invention may aid in reducing rework rate.

Referring now to FIGS. 4A and 4B, the distinction between an application of the SVM loss function and an MLS based function is illustrated. It should be noted that in an implementation of the SVM loss function it is not generally assumed that that the distribution of residuals consists of a normal distribution. As is often the case, the residuals may include unmodeled systematic noise. Moreover, in some instance, the residuals may have a bi-modal distribution. In this setting, the convention MLS analysis routine would be heavily biased.

FIG. 4A illustrates residual distributions associated with both a MLS and a SVM loss function, wherein the residuals of the distributions include normal random noise. It is assumed herein that the associated overlay measurements display linear behavior plus normal random noise. Moreover, the residual specification for the lot is assumed to be 3 nm. The graph illustrated in FIG. 4A depicts the residuals after applying the correctables associated with 1) an MLS routine and 2) a SVM loss function.

With regard to the MLS routine, the residuals associated with the MLS routine display a normal distribution shape, however, the maximum residual of the distribution is larger than the predetermined overlay specification of 3 nm. As such, under conventional analysis techniques, the associated lot would be failed. In contrast, all of the residual values associated with the SVM loss function display values below the predetermined overlay specification. As such, the lot is passed and a rework is avoided.

FIG. 4B illustrates residual distributions associated with both a MLS and a SVM loss function, wherein the residuals of the distributions include noise having a pure second order systematic component. As above, FIG. 4B depicts the residuals after applying the correctables associated with 1) an MLS routine and 2) a SVM loss function. Again, with regard to the MLS routine, the maximum residual of the distribution is larger than the predetermined overlay specification of 3 nm, leading to the failure of the lot. Further, under a SVM loss function analysis, the lot is passed as the SVM loss function corrects the overlay in such a way that the largest residual is below the overlay specification.

While the SVM loss function of step 304 represents a significant advantage over conventional methods, it is recognized herein that efforts to avoid failing a given lot must be balanced against the possibility of producing correctables that are less valuable in correcting subsequent lots.

The SVM loss function of Eq. 1 may attempt to reduce the required threshold value 'Th' to the minimum value possible which leads to nonfailure of tail residuals. It is important to consider, however, whether the correctables derived from the SVM loss function are reliable. It is noted that in some instances it is appropriate to fail a lot based on tail residuals.

Figure 5:
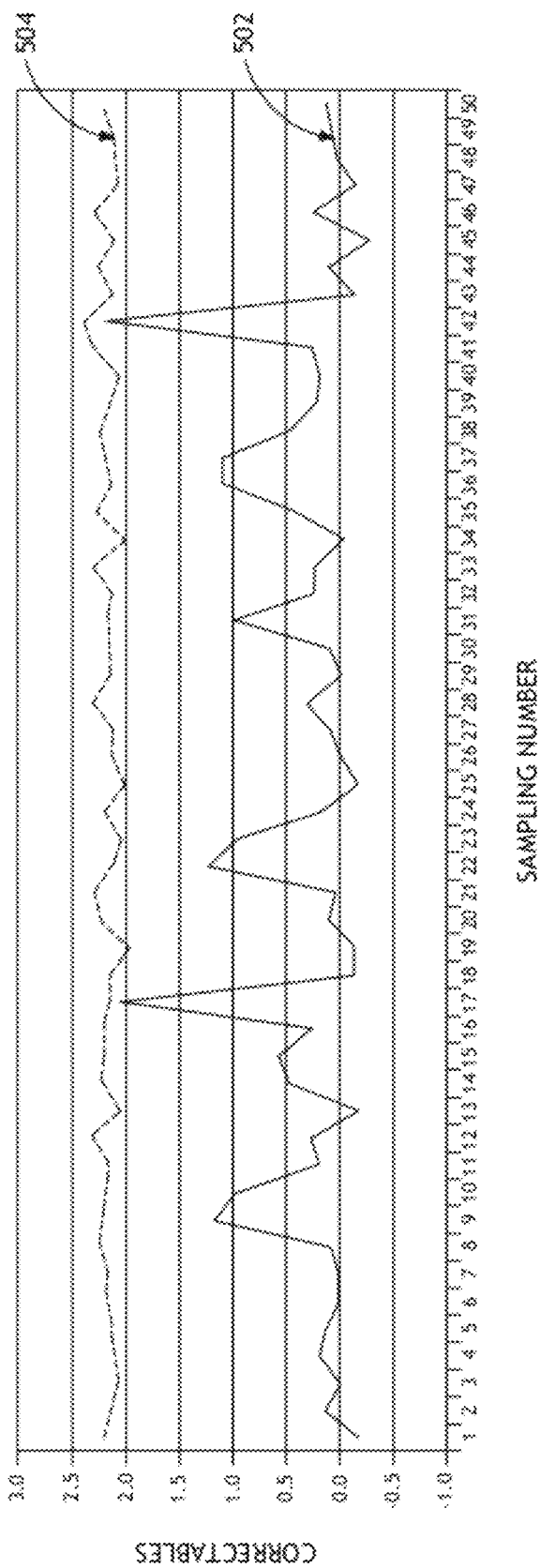
FIG. 5 is a data set illustrating a correctable versus sampling number for two different standard deviation-thresholds, Th1 and Th2, in accordance with one embodiment of the present invention.

In a further step 308, a self-consistency step may be applied to results of the loss function of step 304 in order to measure the quality of the results outputted by the SVM loss function of Eq. 1. The self-consistency step may be carried out by selecting a number (e.g., 50) of random sub-samples from the overlay data set. Each of the sub-samplings is of the same size. For instance, each sub-sampling may represent 90% of the possible samplings. In one aspect, for each of the sub-samplings the correctables from the SVM loss function may be calculated and the standard deviation of the correctable across the different sub-samples may be estimated. In a further aspect, a predefined standard deviation threshold may be selected of the standard deviation of the calculated correctables should not exceed FIG. 5 illustrates a set of calculations of correctables with 50 random sub-samplings, with each random sub-sampling representing 90% of the possible sites. As illustrated in FIG. 5, two standard deviation thresholds are utilized, Th1 and Th2. The correctable estimates produced by Th1 (curve 502) display a significantly larger noise level than estimates produced by Th2 (curve 504). For example, the correctable estimates associated with Th1 502 may display a standard deviation of 0.527 nm, while that of Th2 504 may display a standard deviation of 0.083 nm. Further, the implementation of a standard-deviation threshold may differentiate between two or more thresholds. For example, a standard deviation threshold of 0.3 nm will differentiate between Th1 and Th2, rendering Th2 as the superior option. It is contemplated herein that the addition of a self-consistency routine may be utilized to insure the reliability of the residual distribution produced by the SVM loss function of step 304 of the present invention.

It is further recognized that a variety of self-consistency algorithms and routines may be applied to the correctable curves produced by the SVM loss function of the present invention. In a general sense, any self-consistency algorithm known by those skilled in the art may be suitable for implementation in the present invention.

FIG. 6 is a flow diagram illustrating steps performed in alternative process 600 for providing process tool correctables to one or more process tools.

In a first step 602, in a manner similar to process 300, a first measurement process may measure one or more characteristics of a plurality of targets distributed across one or more fields of a wafer of a lot of wafers. As described above, the measurements performed on one or more wafers of a lot of wafers may include measurements processes similar to the measurements performed in step 302 of process 300. In this manner, the various measurements and methods of measurements as outlined in step 302 may be applied to step 602 of process 600.

In a second step 604, a first and second set of process tool correctables may be determined utilizing a loss function. In one aspect, the first set of process tool correctables may be calculated for residuals larger than a selected threshold level, while the second set of correctables may be calculated for residuals smaller than the threshold level. In a further aspect, the first set of process tool correctables includes model parameters that minimize the difference between a scaled residual and the selected threshold. The second set of process tool correctables includes model parameters that minimize the scaled residual. In a third step 606, the determined set of process tool correctables may be utilized to monitor or adjust one or one or more process tools. Where applicable procedures and methods described in step 304 and 306 of process 300 should be interpreted to extend to the second step 604 and third step 606 of process 600.

The loss function of step 604 may take the form:

$$\text{Loss Function} = \min_\beta \begin{cases} \alpha \cdot (|y - f(x, \beta)| & |y - f(x, \beta)| < Th \\ \alpha \cdot (|y - f(x, \beta)| - Th & \text{Otherwise} \end{cases} \quad \text{(Eq. 3)}$$

where, as in Eq. 1, y represents a characteristic (e.g., overlay error) measured at a selected position (e.g., position along x-axis), $f(x,\beta)$ represents a model fitted to the measured characteristic of step 602, wherein $\beta$ represents the parameters of the utilized modeling function, and the quantity $|y-f(x,\beta)|$ represents the 'norm' of the residual $y-f(x,\beta)$. Morevover, 'Th' represents a threshold residual value. In a further aspect, the loss function of process 600 may include a scaling factor $\alpha$. The scaling factor $\alpha$ may have values between 0 and 1 and may be utilized to scale the residuals of the residual distribution.

For residuals below the selected threshold Th the scaling factor $\alpha$ may act to scale the norm of the residual, $|y-f(x,\beta)|$, by some selected degree. This is opposed to the methodology described previously herein with respect to step 304 of the process 300, wherein residuals below the threshold value Th were nullified. In step 604 of process 600, the residuals below Th are not disregarded, but rather their contribution is merely reduced. Further, the loss function of Eq. 3 acts to minimize the scaled norm of the residual $\alpha|y-f(x,\beta)|$ with respect to $\beta$.

In contrast, for residuals above the threshold Th, the scaling factor $\alpha$ acts to scale the difference between the norm of the scaled residual $\alpha|y-f(x,\beta)|$ and a threshold value Th with respect to the model parameter $\beta$. It should be recognized by those skilled in the art that the specific form of $f(x,\beta)$ may depend on a variety of factors. In a general sense any suitable overlay function known in the art may be utilized as $f(x,\beta)$ of the loss function of Eq. 3.

It is further noted that the process 600 may include an additional self-consistency step 608. The self-consistency routine 608 may be implemented in a manner similar to the self-consistency routine 308 of process 308.

Figure 7:
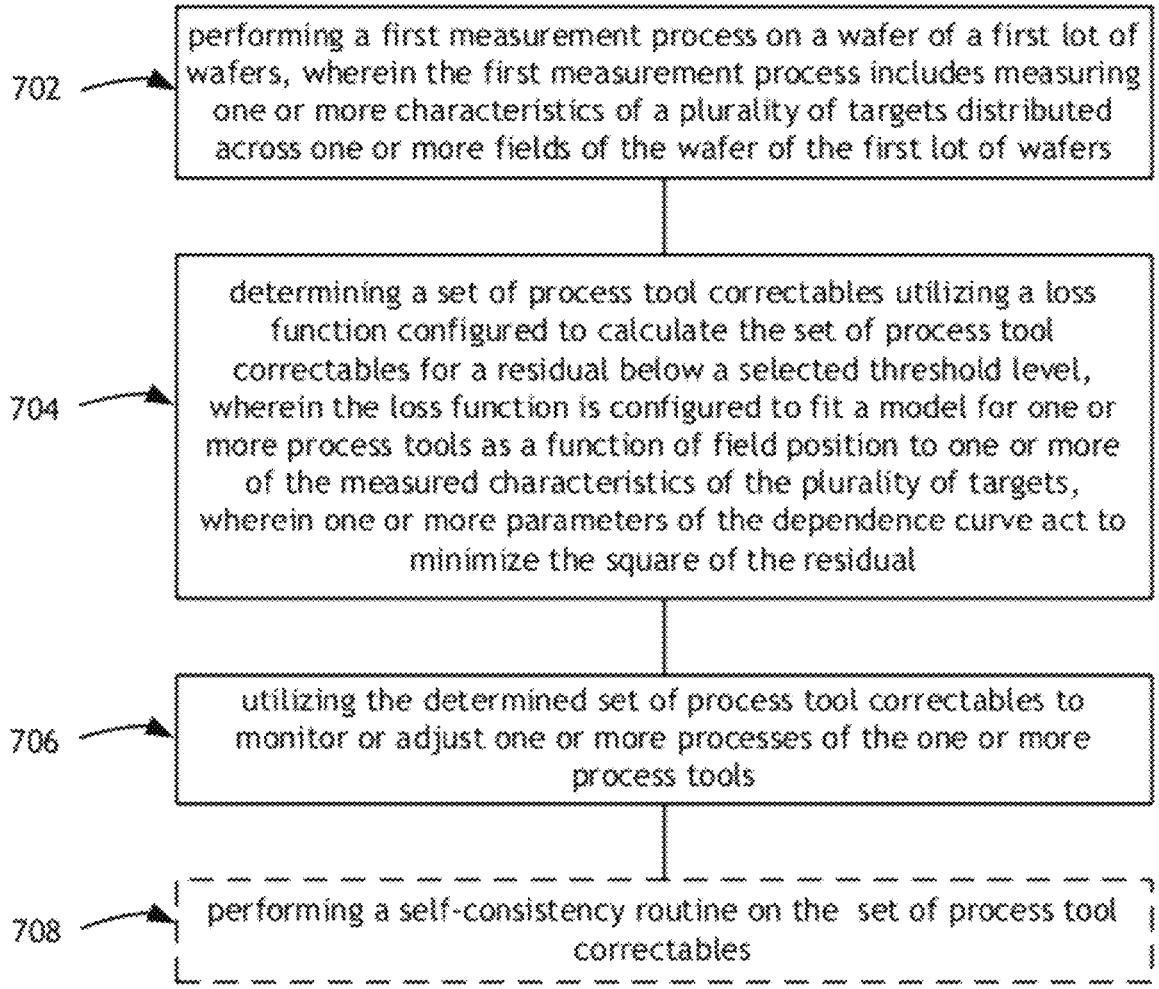
FIG. 7 is a flow diagram illustrating a method for providing process tool correctables to one or more process tools, in accordance with one embodiment of the present invention.

FIG. 7 is a flow diagram illustrating steps performed in alternate process 700 for providing process tool correctables to one or more process tools.

In a first step 702, in a manner similar to process 300, a first measurement process may measure one or more characteristics of a plurality of targets distributed across one or more fields of a wafer of a lot of wafers. As described above, the measurements performed on one or more wafers of a lot of wafers may include measurements processes similar to the measurements performed in step 302 of process 300. In this manner, the various measurements and methods of measurements as outlined in step 302 may be applied to step 702 of process 700.

In a second step 704, a set of process tool correctables for a residual larger than a selected threshold level may be determined via a loss function using the measurement results of step 702. In one aspect, the loss function is configured to fit a model for one or more process tools as a function of field position to one or more of the measured characteristics of step 702. In another aspect, the calculated set of process tool correctables includes parameter values of the model that act to minimize the square of the residual. In a third step 706, the determined set of process tool correctables may be utilized to monitor or adjust one or one or more process tools. Where applicable procedures and methods described in step 304 and 306 of process 300 should be interpreted to extend to the second step 704 and third step 706 of process 700.

The loss function of step 704 may take the form:

$$\text{loss function} = \min_\beta \begin{cases} (y - f(x, \beta))^2 & |y - f(x, \beta)| < Th \\ 0 & \text{Otherwise} \end{cases} \quad \text{(Eq. 4)}$$

where, again, y represents a characteristic (e.g., overlay error) measured at a selected position (e.g., position along x-axis), $f(x,\beta)$ represents a model fitted to the measured characteristic of step 702, wherein $\beta$ represents the parameters of the utilized modeling function utilized to minimize the square of the residuals.

It is noted herein that the loss function of Eq. 4 differs from that of Eq. 1 and Eq. 3 in that Eq. 4 nullifies all residuals above a selected threshold Th. For residuals below the selected Th value, the loss function of Eq. 4 may act to minimize the square of the residuals with respect to the model parameters $\beta$. The loss function of Eq. 4 may be particularly advantageous in instances where a user seeks to minimize the impact of the 'tails' of a residual distribution with respect to the remainder of the distribution.

It is further noted that the process 700 may include an additional self-consistency step 708. The self-consistency routine 708 may be implemented in a manner similar to the self-consistency routine 308 of process 308.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method generates the sub-sampling plan, the method may include storing the sub-sampling plan in a metrology recipe in a storage medium. In addition, results or output of the embodiments described herein may be stored and accessed by a metrology system such as a CD SEM such that a metrology system can use the sub-sampling plan for metrology assuming that the output file can be understood by the metrology system. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for providing process tool correctables to one or more process tools, comprising:

performing a first measurement process on a wafer of a lot of wafers with a measurement system, wherein the first measurement process includes measuring one or more characteristics of a plurality of targets distributed across one or more fields of the wafer of the lot of wafers;

determining, with one or more processors communicatively coupled to the measurement system, a set of process tool correctables for a residual larger than a selected threshold level utilizing a loss function, wherein the loss function is configured to fit a model for one or more process tools, as a function of field position, to one or more of the measured characteristics of the plurality of targets measured with the measurement system, wherein the set of process tool correctables includes one or more parameters of the model that act to minimize the difference between a norm of the residual and the selected threshold when the norm of the residual is equal to or greater than the selected threshold, wherein the loss function nullifies the residual when the norm of the residual is below the selected threshold;

transmitting one or more control signals from the one or more processors to the one or more process tools, the one or more control signals being a function of the determined set of process tool correctables; and controlling the one or more process tools based on the one or more control signals in order to control one or more processes associated with the one or more process tools.

2. The method of claim 1, further comprising:
performing a self-consistency routine on the determined set of process tool correctables.

3. The method of claim 2, wherein the performing a self-consistency routine to the determined set of process tool correctables comprises:
performing a self-consistency routine to the determined set of process tool correctables utilizing a plurality of random samplings of the measured characteristics of the performed measurement process, wherein each of the random samplings is of the same size.

4. The method of claim 1, wherein the loss function comprises:
a support vector machine (SVM) algorithm based loss function.

5. The method of claim 1, wherein the model comprises:
a nonlinear overlay function.

6. The method of claim 1, wherein the performing a first measurement process on a wafer of a lot of wafers comprises:
performing a metrology measurement on a wafer of a lot of wafers.

7. The method of claim 1, wherein the one or more measured characteristics of the plurality of targets include at least one of an overlay value, a critical dimension (CD) value, a focus value, or a dose value.

8. The method of claim 1, wherein the calculated correctable for each field includes at least one of an overlay correctable, a dose correctable, or a focus correctable.

9. The method of claim 1, wherein a result of the first measurement on the wafer of the lot of wafers includes information indicative of variation in the measurement.

10. The method of claim 1, wherein the one or more process tools comprise:
at least one of a lithography tool or a scanner tool.

11. A method for providing process tool correctables, comprising:
performing a first measurement process on a wafer of a first lot of wafers with a measurement system, wherein the first measurement process includes measuring one or more characteristics of a plurality of targets distributed across one or more fields of the wafer of the first lot of wafers;
determining, with one or more processors communicatively coupled to the measurement system, a first and second set of process tool correctables utilizing a loss function configured to calculate the first set of process tool correctables when a residual is larger than a selected threshold level and the second set of process tool correctables when the residual is smaller than the selected threshold level, wherein the loss function is configured to fit a model for one or more process tools as a function of field position to one or more of the measured characteristics of the plurality of targets measured with the measurement system, wherein the first set of process tool correctables includes one or more parameters of the model that minimize the difference between a scaled residual and the selected threshold when the norm of the residual is equal to or greater than the selected threshold, wherein the second set of process tool correctables includes one or more parameters of the model that minimize the scaled residual when the norm of the residual is below the selected threshold;
transmitting one or more control signals from the one or more processors to the one or more process tools, the one or more control signals being a function of the determined first and second set of process tool correctables; and
controlling the one or more process tools based on the one or more control signals in order to control one or more processes associated with the one or more process tools.

12. The method of claim 11, further comprising:
performing a self-consistency routine on the first set of process tool correctables and the second set of process tool correctables.

13. The method of claim 12, wherein the performing a self-consistency routine to the determined set of process tool correctables comprises:
performing a self-consistency routine to the determined set of process tool correctables utilizing a plurality of random samplings of the measured characteristics of the performed measurement process, wherein each of the random samplings is of the same size.

14. The method of claim 11, wherein the model comprises:
a nonlinear model overlay function.

15. The method of claim 11, wherein the performing a first measurement process on a wafer of a lot of wafers comprises:
performing a metrology measurement on a wafer of a lot of wafers.

16. The method of claim 11, wherein the calculated correctable for each field includes at least one of an overlay correctable, a dose correctable, or a focus correctable.

17. A method for providing process tool correctables, comprising:
performing a first measurement process on a wafer of a first lot of wafers with a measurement system, wherein the first measurement process includes measuring one or more characteristics of a plurality of targets distributed across one or more fields of the wafer of the first lot of wafers;
determining, with one or more processors communicatively coupled to the measurement system, a set of process tool correctables utilizing a loss function configured to calculate the set of process tool correctables for a residual below a selected threshold level, wherein the loss function is configured to fit a model for one or more process tools as a function of field position to one or more of the measured characteristics of the plurality of targets measured with the measurement system, wherein one or more parameters of the dependence curve act to minimize the square of the residual when the norm of the residual is below a selected threshold, wherein the loss function nullifies the residual when the residual is equal to or greater than the selected threshold;
transmitting one or more control signals from the one or more processors to the one or more process tools, the one or more control signals being a function of the determined set of process tool correctables; and
controlling the one or more process tools based on the one or more control signals in order to control one or more processes associated with the one or more process tools.

18. The method of claim 17, further comprising:
performing a self-consistency routine on the set of process tool correctables.

19. The method of claim 18, wherein the performing a self-consistency routine to the determined set of process tool correctables comprises:
performing a self-consistency routine to the determined set of process tool correctables utilizing a plurality of random samplings of the measured characteristics of the performed measurement process, wherein each of the random samplings is of the same size.

20. The method of claim 17, wherein the model comprises: a nonlinear model overlay function.

21. The method of claim 17, wherein the performing a first measurement process on a wafer of a lot of wafers comprises: performing a metrology measurement on a wafer of a lot of wafers.

22. The method of claim 17, wherein the calculated correctable for each field includes at least one of an overlay correctable, a dose correctable, or a focus correctable.

23. A system for providing process tool correctables to one or more process tools, comprising:
a measurement system configured to perform a first measurement process on a wafer of a lot of wafers, wherein the first measurement process includes measuring one or more characteristics of a plurality of targets distributed across one or more fields of the wafer of the lot of wafers;
one or more process tools; and
one or more processors communicatively coupled to at least one of the measurement system or the one or more process tools, the one or more processors configured to execute program instructions configured to cause the one or more processors to:
determine a set of process tool correctables for a residual larger than a selected threshold level utilizing a loss function, wherein the loss function is configured to fit a model for the one or more process tools, as a function of field position, to one or more of the measured characteristics of the plurality of targets measured with the measurement system, wherein the set of process tool correctables includes one or more parameters of the model that act to minimize the difference between a norm of the residual and the selected threshold when the norm of the residual is equal to or greater than the selected threshold, wherein the loss function nullifies the residual when the norm of the residual is below the selected threshold; and
transmit one or more control signals to the one or more process tools to control the one or more process tools, the one or more control signals being a function of the determined set of process tool correctables.

24. A system for providing process tool correctables to one or more process tools, comprising:
a measurement system configured to perform a first measurement process on a wafer of a lot of wafers, wherein the first measurement process includes measuring one or more characteristics of a plurality of targets distributed across one or more fields of the wafer of the lot of wafers;
one or more process tools; and
one or more processors communicatively coupled to at least one of the measurement system or the one or more process tools, the one or more processors configured to execute program instructions configured to cause the one or more processors to:
determine a first and second set of process tool correctables utilizing a loss function configured to calculate the first set of process tool correctables when a residual is larger than a selected threshold level and the second set of process tool correctables when the residual is smaller than the selected threshold level, wherein the loss function is configured to fit a model for the one or more process tools as a function of field position to one or more of the measured characteristics of the plurality of targets measured with the measurement system, wherein the first set of process tool correctables includes one or more parameters of the model that minimize the difference between a scaled residual and the selected threshold when the norm of the residual is equal to or greater than the selected threshold, wherein the second set of process tool correctables includes one or more parameters of the model that minimize the scaled residual when the norm of the residual is below the selected threshold; and
transmit one or more control signals to the one or more process tools to control the one or more process tools, one or more control signals being a function of the determined first and second set of process tool correctables.

25. A system for providing process tool correctables to one or more process tools, comprising:
a measurement system configured to perform a first measurement process on a wafer of a lot of wafers, wherein the first measurement process includes measuring one or more characteristics of a plurality of targets distributed across one or more fields of the wafer of the lot of wafers;
one or more process tools; and
one or more processors communicatively coupled to at least one of the measurement system or the one or more process tools, the one or more processors configured to execute program instructions configured to cause the one or more processors to:
determine a set of process tool correctables utilizing a loss function configured to calculate the set of process tool correctables for a residual below a selected threshold level, wherein the loss function is configured to fit a model for the one or more process tools as a function of field position to one or more of the measured characteristics of the plurality of targets measured with the measurement system, wherein one or more parameters of the dependence curve act to minimize the square of the residual when the norm of the residual is below a selected threshold, wherein the loss function nullifies the residual when the residual is equal to or greater than the selected threshold; and
transmit one or more control signals to the one or more process tools to control the one or more process tools, the one or more control signals being a function of the determined set of process tool correctables.

* * * * *